United States Patent [19]
Louis

[11] Patent Number: 5,133,906
[45] Date of Patent: Jul. 28, 1992

[54] AERATOR

[76] Inventor: Tony Louis, 1708 Evergreen St., Burbank, Calif. 91505

[21] Appl. No.: 594,707

[22] Filed: Oct. 9, 1990

[51] Int. Cl.⁵ .............................................. B01F 3/04
[52] U.S. Cl. ................................... 261/122.1; 119/5
[58] Field of Search ........................... 261/122; 119/5

[56] References Cited

U.S. PATENT DOCUMENTS

| | | | |
|---|---|---|---|
| 2,305,796 | 12/1942 | Seidel | 119/5 |
| 2,686,139 | 8/1954 | Lamb et al. | 261/124 |
| 4,118,447 | 10/1978 | Richter | 261/122 |
| 4,655,915 | 4/1987 | Carpinone | 261/124 |

FOREIGN PATENT DOCUMENTS

| | | | |
|---|---|---|---|
| 2243902 | 3/1974 | Fed. Rep. of Germany | 119/5 |
| 2749600 | 5/1979 | Fed. Rep. of Germany | 119/5 |
| 3319161 | 11/1984 | Fed. Rep. of Germany | 261/122 |
| 149367 | 4/1962 | U.S.S.R. | 261/122 |
| 0740295 | 6/1980 | U.S.S.R. | 261/122 |

Primary Examiner—Tim Miles
Attorney, Agent, or Firm—James E. Brunton

[57] ABSTRACT

An air bubble producing device, or air stone, for use in aquariums to produce uniform air bubbles in which air flowing into the device is first distributed circumferentially of the device and then axially thereof for uniform passage between adjacent pairs of a plurality of longitudinally spaced specially serrated disks. The device includes a weighted portion and a mechanism for precisely adjusting the spacing between the disks.

10 Claims, 2 Drawing Sheets

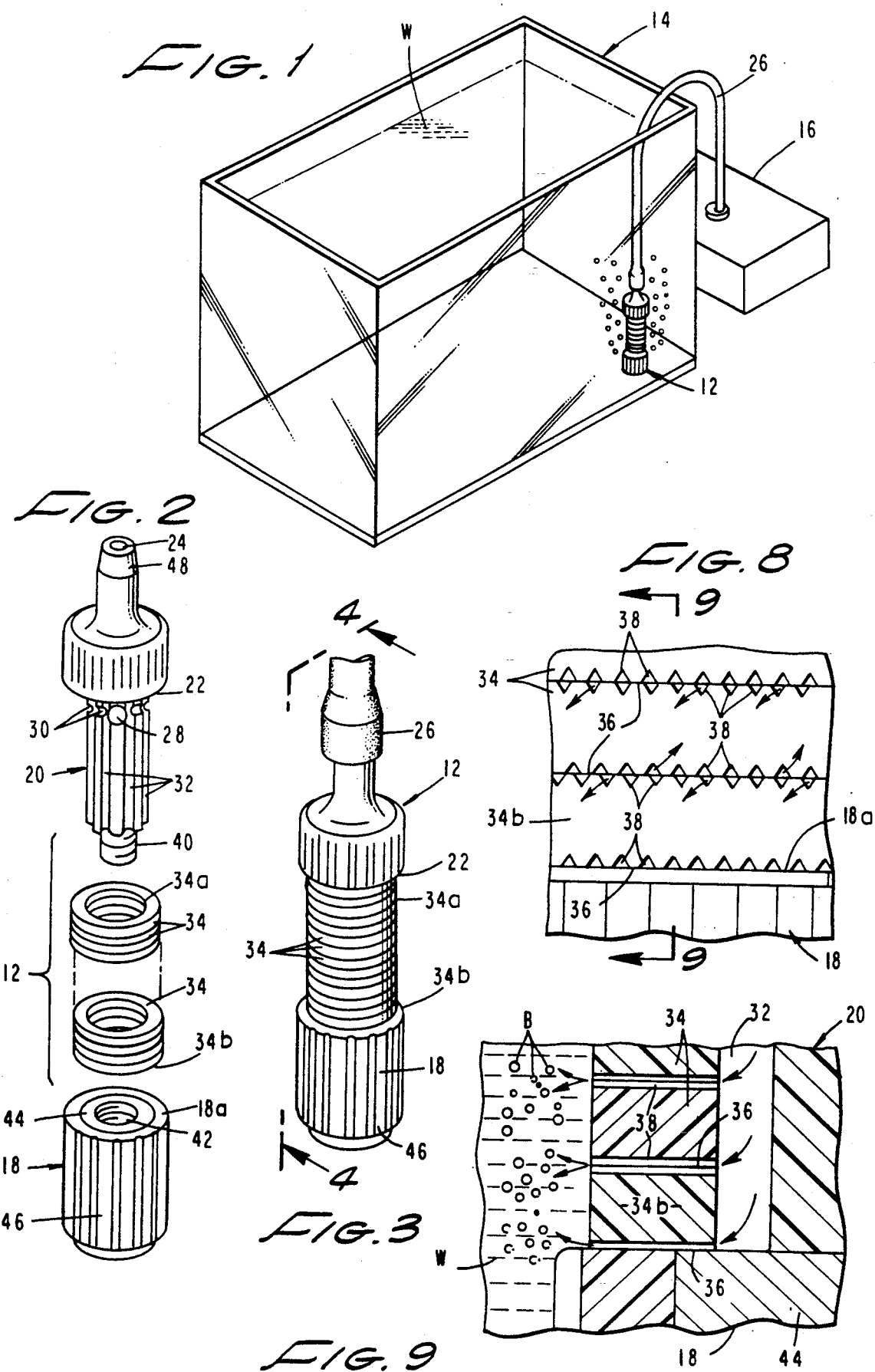

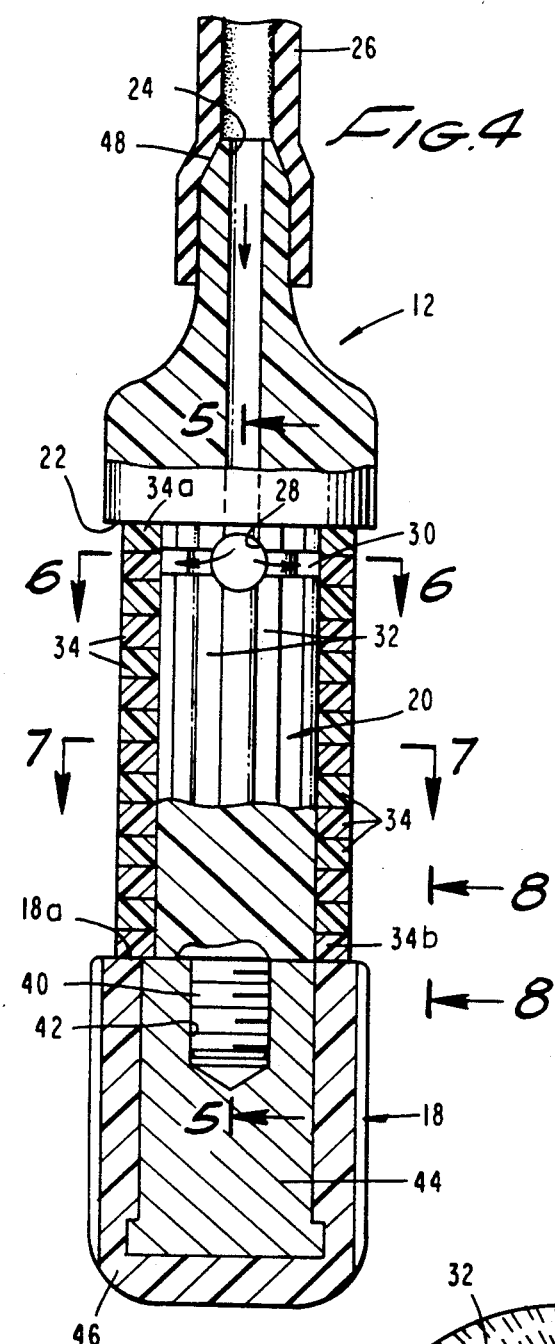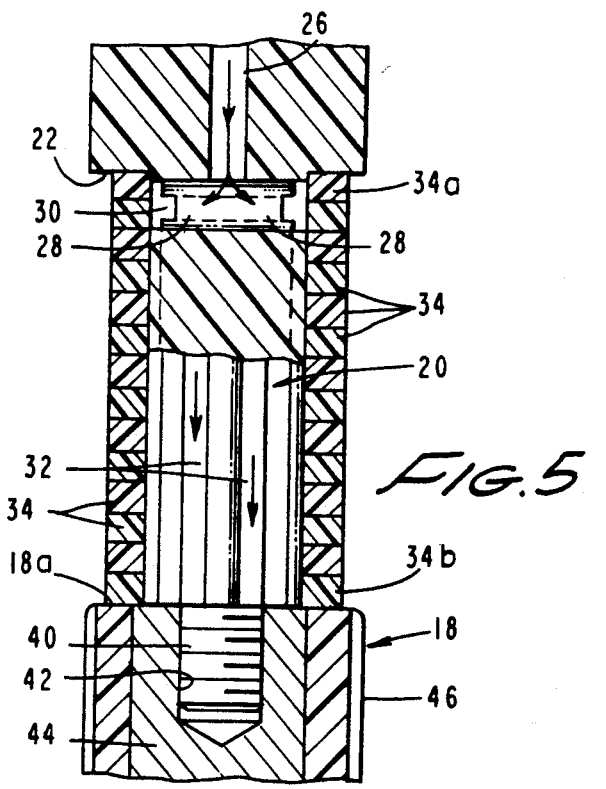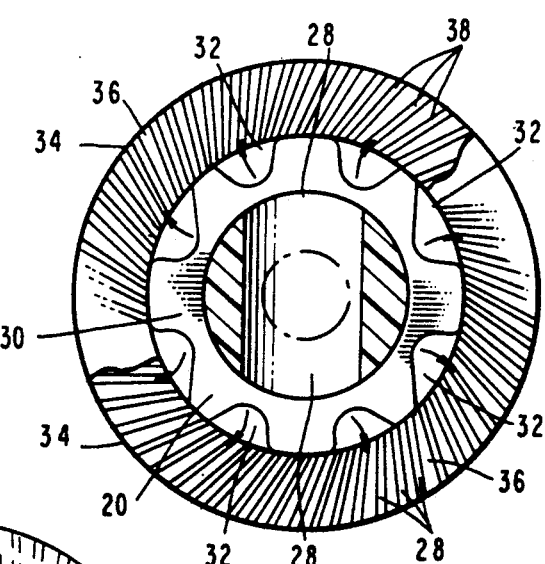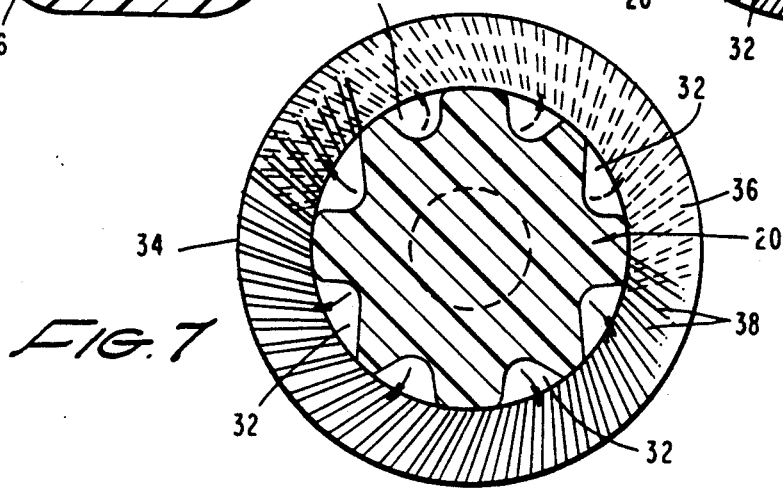

AERATOR

BACKGROUND OF THE INVENTION

Field of the Invention

The present invention relates generally to air dispensing devices. More particularly, the invention concerns an air bubble producing device, or air stone, for use in aquariums.

DISCUSSION OF THE INVENTION

Introduction

Aquariums typically comprise a tank for containing water, means for controllably heating the water, filter means for continuously filtering the water to remove debris and means for aerating the water to maintain an adequate supply of oxygen within the water.

The thrust of the present invention is to provide a new and improved aerator for aerating water contained within an aquarium. Several types of bubble producing devices for use with aquariums have been suggested in the past. One such device is constructed of silica glass beads. When air under pressure is fed into the device small bubbles escape through the porous outer surface of the device so as to aerate the water.

A slightly more sophisticated prior art device is disclosed in U.S. Pat. No. 4,655,915 issued to Carpinone. This device comprises a tube for receiving air under pressure at one end and a solid portion closing off the other end of the tube. A stationary stop is mounted on the tube adjacent the air inlet and a plurality of spaced openings are located in the tube between the stop and the solid portion for permitting discharge of air. A stack of perforated disks are located on the tube between the stop and the solid portion which is threaded to accommodate a pair of nuts to tighten the disks against the stop. The disks are made from a hydrophobic polymer and are constructed and arranged so that fine bubbles are emitted from the device intermediate the disks. As best seen in FIG. 3 of Carpinone, air outlet holes 34 are spaced longitudinally along section 28 of the tube for the radially outward discharge of air entering the tube at 26. With is construction, air tends to flow outwardly between only the disks located proximate holes 34 rather than to flow outwardly uniformly between all of the disks that are stacked onto the tubular member.

As will be discussed in greater detail hereinafter, the device of the present invention embodies a uniquely configured air flow path which insures a uniform outward flow of air between each pair of a plurality of adjacent disks which make up a stack of longitudinally spaced disks, thereby maximizing bubble production and providing superior aeration of the water within the aquarium. The device of the present invention is also strategically weighted to maintain proper orientation of the device within the aquarium.

SUMMARY OF THE INVENTION

It is an object of the present invention to provide a vastly improved air bubble producing device, or air stone, for use in aquariums in which air flowing into the device is uniquely distributed circumferentially then axially the length of the device for uniform passage between adjacent pairs of a plurality of longitudinally spaced serrated disks.

Another object of the invention is to provide a device of the aforementioned character in which an easy-to-use, adjusting mechanism is provided to enable adjustment of the disks so as to precisely control the size of bubbles being emitted from the device.

Another object of the invention is to provide a compact, easy-to-use aerator or bubble producing device, which can be readily disassembled for cleaning and then expeditiously reassembled in a manner such that the disks are always correctly aligned and positioned for optimum bubble production.

Still another object of the invention is to provide a device of the character described in which one end of the device is weighted to maintain proper orientation of the device within the aquarium thereby eliminating the need for suction cups, clamps or other types of connectors to maintain the device at the desired location within the aquarium.

Another object of the invention is to provide a bubble producing device which is constructed from durable, corrosion-resistant material to ensure long life and minimum maintenance.

Yet another object of the invention is to provide a device of the type described in the preceding paragraphs which is compact, easy to disassemble for cleaning, quickly adjustable and inexpensive to manufacture.

BRIEF DESCRIPTION OF THE DRAWINGS

FIG. 1 is a generally perspective view of an aquarium apparatus embodying the aerator of the present invention.

FIG. 2 is a generally perspective, exploded drawing of the aerator.

FIG. 3 is a generally perspective view of the aerator of the invention in an assembled configuration.

FIG. 4 is an enlarged cross-sectional view taken along lines 4—4 of FIG. 3.

FIG. 5 is a cross-sectional view taken along lines 5—5 of FIG. 4.

FIG. 6 is a cross-sectional view taken along lines 6—6 of FIG. 4.

FIG. 7 is a cross-sectional view taken along lines 7—7 of FIG. 4.

FIG. 8 is a cross-sectional view taken along lines 8—8 of FIG. 4.

FIG. 9 is a cross-sectional view taken along lines 9—9 of FIG. 8.

DESCRIPTION OF THE INVENTION

Referring to the drawings and particularly to FIGS. 1, 2 and 3, the aerator of the present invention, generally designated in the drawings by the numeral 12, is used in an aquarium apparatus comprising a tank assembly 14 having a source of air under pressure 16 and containing water W. The preferred form of the aerator of the invention comprises a weighted portion 18 which is removably interconnected to an elongated body portion 20. Body portion 20 has a shoulder 22 located proximate one end and connector means located proximate the other end for removably interconnecting the weighted portion and the body portion 20.

As best seen by also referring to FIGS. 4 and 5, body portion 20 further includes an air inlet port 24 for interconnection with source of air 16 by any suitable means such as a length of plastic tubing 26. Body portion 20 is also provided with a pair of radially extending air passageways 28 which are in communication with a circumferentially extending air passageway 30. As indicated in FIG. 2, a plurality of longitudinally extending, circumferentially spaced air passageways 32 are provided in body portion 20 and are also in communication with circumferentially extending air passageway 30. The unique manner of air flow through these communicating air passageways will be described presently.

Closely receivable over body portion 22 are a plurality of longitudinally spaced annular shaped disks 34. As indicated in FIGS. 6, 7 and 8, each of the annular shaped disks 34 is provided with radially extending serrated surfaces 36. The serrations 38 formed on surfaces 36 can be of varying angles and depths depending upon the size of air bubbles desired to be produced. Further, as indicated in FIG. 7, the serrations on one disk may be adjusted relative to the serrations on the adjoining disk in a multiplicity of orientations so as to precisely control the flow of air between the disks and accordingly control the character of the bubbles B produced in the water W.

In using the apparatus of the invention, disks 34 are sequentially placed over body portion 20 as shown in FIG. 2 to form a stack wherein the upper most disk 34a will abut shoulder 22. (See also FIG. 3) and the lower most disk 34b will abut a shoulder 18a provided on weighted portion 18 after portion 18 has been interconnected with body portion 20. In the embodiment of the invention shown in the drawings, the connector means comprises a threaded portion 40 which is threadably receivable within an internally threaded bore 42 provided in weighted portion 18. The length of body portion 20 is such that, by tightening or loosening weighted portion 18, varying degrees of pressure can be exerted against the disks so s to enable precise regulation of the spacing between the disks. In this way the size of air bubbles to be produced in the water W can be precisely controlled.

Weighted portion 18 can be constructed in various ways well known to those skilled in the art, but a preferred construction is as shown in the drawings wherein a cylindrically shaped stainless steel member 44 is contained within an outer plastic tubular body or housing 46. Member 44 functions both as a weight and as a part of the connector means of the invention. Outer housing 46 is preferably knurled to permit easy tightening and loosening of the weighted portion relative to the body portion.

With the aerator assembled in the manner shown in FIG. 3, plastic tube 26 can be interconnected to the unit by slipping it over the upper tapered portion 48 of body 22. After the tube has been connected to the aerator, the aerator can be lowered into the aquarium in the manner shown in FIG. 1 and positioned at any desired location within the aquarium. The inclusion within the device of weight 44, obviates the need for suction cups or mechanical clamping devices of a character typically found in prior art devices for positioning the aerator within the aquarium.

Upon energization of the air source 16, air will be caused to flow through tube 28 toward first flow inlet port 24 then radially outwardly through radially extending passages 26. The air will then flow circumferentially through passageway 30 and then longitudinally of body portion 20 via longitudinally extending air passageways 32. These passageways, which extend the entire length of the stacked disks, will uniformly direct the air between the disks and into the water in the aquarium via the serrations 36 (FIGS. 8 and 9.) This unique feature of the apparatus of the invention insures production of bubbles uniformly along the entire length of the stack of disks 34.

Having now described the invention in detail in accordance with the requirements of the patent statutes, those skilled in the art will have no difficulty in making changes and modifications in the individual parts or their relative assembly in order to meet specific requirements or conditions. Such changes and modifications may be made without department from the scope and spirit of the invention, as set forth in the following claims.

I claim:

1. An aerator for use in a tank assembly containing water and having a source of air under pressure, said device comprising:
   (a) a weighted portion comprising a tubular body and a generally cylindrically shaped stainless steel weight receivable within said tubular body;
   (b) an elongated body portion have a shoulder located proximate one end and connector means located proximate the other end for removably connecting said weighted portion to said body portion, said body portion further having:
      (i) an air inlet port for interconnection with the source of air;
      (ii) a pair of oppositely disposed, radially extending air passageways;
      (iii) a circumferentially extending air passageway in communication with said radially extending air passageways;
      (iv) a plurality of longitudinally extending, circumferentially spaced air passageways in communication with said circumferentially extending air passageway; and
   (c) a plurality of longitudinally spaced, annular shaped disks closely receivable over said body portion, each of said disks having a radially extending serrated surface.

2. A device as defined in claim 7 in which said plurality of disks are disposed intermediate said shoulder and said weighted portion.

3. An aerator for use in a tank assembly containing water and having a source of air under pressure, said device comprising:
   (a) a weighted portion comprising a tubular body and a generally cylindrically shaped stainless steel weight receivable within said tubular body, said stainless steel weight having a threaded bore;
   (b) an elongated body portion having a shoulder located proximate one end and a threaded connector located proximate the other end for threadable interconnection with said weighted portion, said body portion further having:
      (i) an air inlet port for interconnection with the source of air;
      (ii) a pair of oppositely disposed, radially extending air passageways;
      (iii) a circumferentially extending air passageway in communication with said radially extending air passageways;
      (iv) a plurality of longitudinally extending, circumferentially spaced air passageways in communication with said circumferentially extending air passageway; and
   (c) a plurality of longitudinally spaced, annular shaped disks closely receivable over said body portion, each of said disks having a radially extending, serrated surface, said plurality of disks being disposed intermediate said shoulder and said weighted portion.

4. An aerator as defined in claim 3 in which said elongated body portion includes means for connecting said body portion with an air tube.

5. An aerator device for use in a tank assembly containing water and having a source of air under pressure, said device comprising:
  (a) a weighted portion comprising a tubular body and a generally cylindrical shaped stainless steel weight receivable within said tubular body, said weight including a threaded bore and a shoulder portion;
  (b) an elongated body portion having a shoulder located proximate one end and connector means located proximate the other end for removably connecting said weighted portion to said body portion, said connector means comprising a threaded portion mounted on said body portion for threadable engagement with said threaded bore of said weight, said body portion further having:
    (i) an air inlet port for interconnection with the source of air;
    (ii) a radially extending air passageway;
    (iii) a circumferentially extending air passageway in communication with said radially extending air passageway;
    (iv) at least two longitudinally extending, circumferentially spaced air passageways in communication with said circumferentially extending air passageway; and
  (c) a plurality of longitudinally spaced, annular shaped disks closely receivable over said body portion and said weighted portion, each of said disks having a radially extending, serrated surface, one of said disks being adapted to engage said shoulder portion of said weighted portion.

6. A device as defined in claim 5 in which said tubular body of said weighted portion is knurled.

7. A device as defined in claim 6 in which said body portion further includes means for removably connecting said body portion to the source of air under pressure.

8. A aerator for use in a tank assembly containing water and having a source of air under pressure, said device comprising:
  (a) a weighted portion including a shoulder portion, said weighted portion comprising a tubular body and a generally cylindrically shaped stainless steel weight receivable within said tubular body;
  (b) an elongated body portion having a shoulder located proximate one end and connector means located proximate the other end for removably connecting said weighted portion to said body portion, said body portion further having:
    (i) an air inlet port for interconnection with the source of air;
    (ii) a pair of oppositely disposed, radially extending air passageways;
    (iii) a circumferentially extending air passageway in communication with said radially extending air passageways;
    (iv) a plurality of longitudinally extending, circumferentially spaced air passageways in communication with said circumferentially extending air passageway; and
  (c) a plurality of longitudinally spaced annular shaped disks closely receivable over said body portion, each of said disks closely receivable over said body portion, each of said disks having a radially extending serrated surface, said plurality of disks being securely clamped between said shoulder portion of said weighted portion and said shoulder of said body portion.

9. A device as defined in claim 8 in which said tubular body of said weighted portion is knurled.

10. A device as defined in claim 9 in which said body portion further includes means for removably connecting said body portion to the source of air under pressure.

* * * * *